April 4, 1939.  W. E. BARNARD  2,153,231

EDUCATIONAL AND AMUSEMENT DEVICE

Filed Aug. 5, 1937  2 Sheets—Sheet 1

INVENTOR
Walter E. Barnard
BY
Parker, Brockmans & Farmer.
ATTORNEYS

April 4, 1939. W. E. BARNARD 2,153,231
EDUCATIONAL AND AMUSEMENT DEVICE
Filed Aug. 5, 1937 2 Sheets-Sheet 2
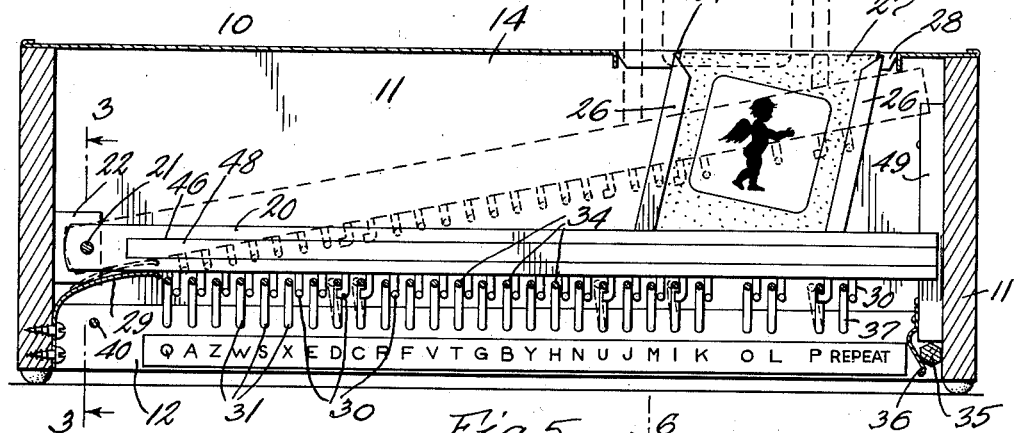
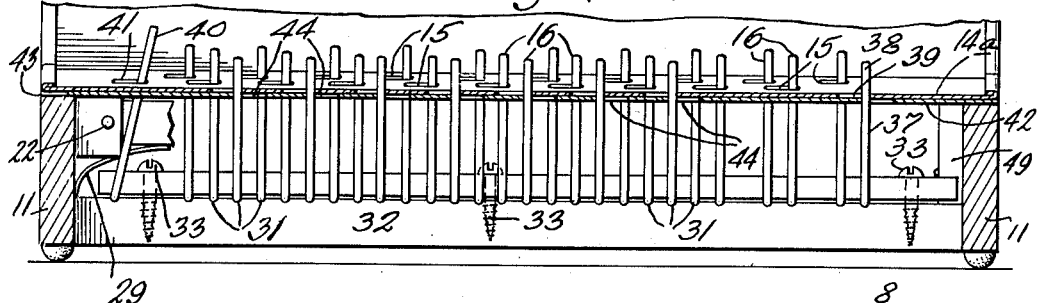
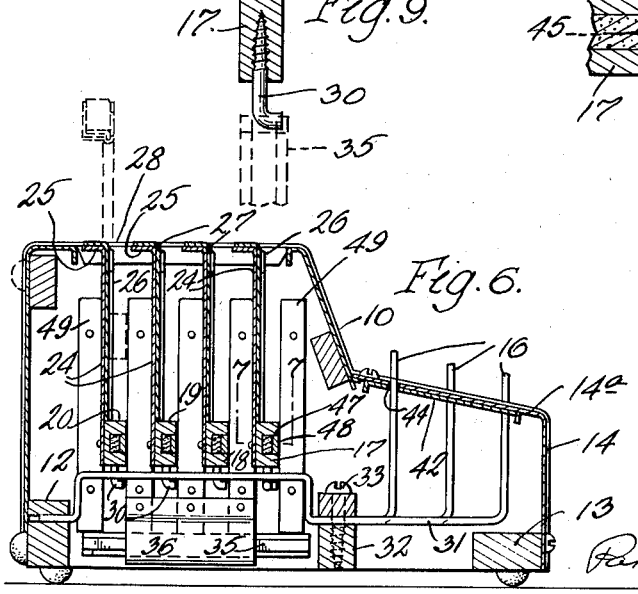
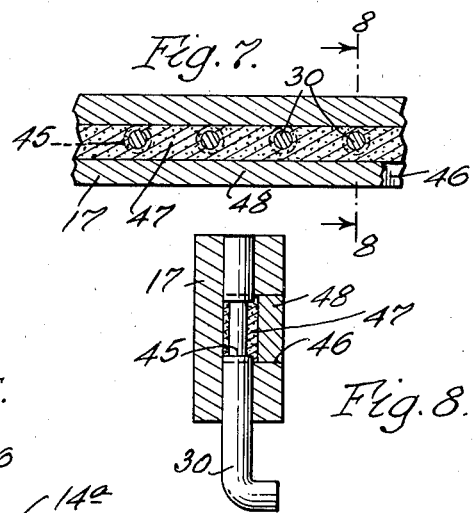
INVENTOR
Walter E. Barnard
BY
Parker, Prockwow & Farmer.
ATTORNEYS Patented Apr. 4, 1939

2,153,231

UNITED STATES PATENT OFFICE 2,153,231

EDUCATIONAL AND AMUSEMENT DEVICE

Walter E. Barnard, Wethersfield, Conn.

Application August 5, 1937, Serial No. 157,563

17 Claims. (Cl. 35—6)

This invention relates to educational and amusement devices, and particularly to devices of this type which may be advantageously used for the teaching of spelling and other simple problems such as simple arithmetic.

An object of this invention is to provide an improved and simple device by which small children, and particularly those in the primary grades, may be taught the spelling of many words and the solution of simple problems such as simple addition, subtraction or multiplication, which at the same time will be entertaining, which will insure the continued interest of the pupil in repeated practicing of the problems or of the spelling of words, and with which the device may be selectively and easily set for the spelling of different words or the performance of different problems.

Another object of the invention is to provide an improved and simple device for the teaching of spelling and simple problems in arithmetic, which will be an aid to the teacher in fixing in the pupil's mind, by repetition, the correct spelling of many words and also the performance of specified problems, which supplements the work of the teacher and provides effective and interesting seat work for the pupils, with which the setting of the device for the spelling of different words, or the performance of different problems, and changes in the same, may be easily carried out, and which will be relatively simple, compact, practical and inexpensive.

Other objects and advantages will be apparent from the following description of an embodiment of the invention, and the novel features will be particularly pointed out hereinafter in connection with the appended claims.

In the accompanying drawings:

Fig. 4 is a longitudinal, sectional elevation through the same, the section being taken approximately along the line 4—4 of Fig. 1;

Fig. 5 is another longitudinal sectional elevation through the same at the keyboard, the section being taken approximately along the line 5—5 of Fig. 1;

Fig. 6 is a transverse sectional elevation through the same, the section being taken approximately along the line 6—6 of Fig. 4;

Fig. 7 is a sectional plan through a portion of one of the display levers, the section being taken approximately along the line 7—7 of Fig. 6;

Figure 1:
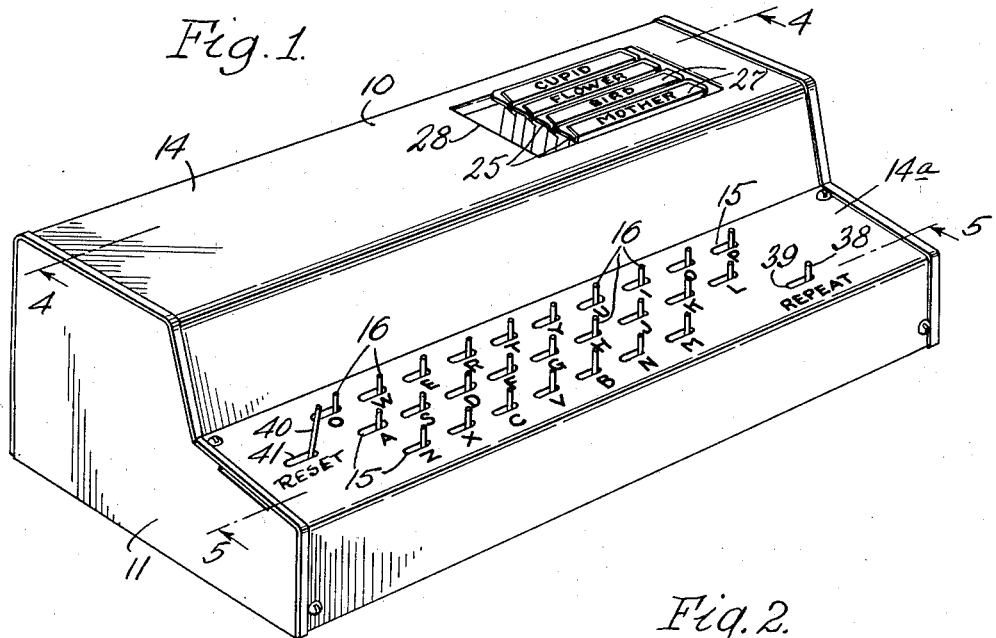
Fig. 1 is a perspective of a spelling instruction device constructed in accordance with this invention.

Fig. 8 is a transverse, sectional elevation through the display lever showing the mounting of a hook, the section being taken approximately along the line 8—8 of Fig. 7; and Fig. 9 is a sectional elevation through a lever at a hook mounted therein, and illustrating a slightly modified mounting of the hook in the lever, and also by the dash lines and manner in which any of the hooks may be set in active or inactive positions.

In the illustrated embodiment of the invention, the device is arranged for instruction in spelling or a knowledge of the letters that make up different words. It includes a simple housing 10 having wooden end walls 11 which are connected by strips 12 and 13. The cover or rear, front and top walls may be of sheet metal 14, and one section or portion 14a thereof represents the keyboard. This keyboard section is provided with a plurality of spaced, parallel slots 15. These slots 15 are arranged in rows and a letter of the alphabet is printed on the keyboard face in proximity to each slot. The letters are preferably arranged on the keyboard face in the same order as they are found in the standard typewriter keyboard, which will aid in the subsequent teaching of typewriting to young children, by teaching the relative locations or arrangements of the letters on a standard keyboard. Individually operated elements or handles 16 extend upwardly through the slots 15 and if desired the letters may be applied directly to the operating elements or keys 16 as in typewriters.

Figure 3:
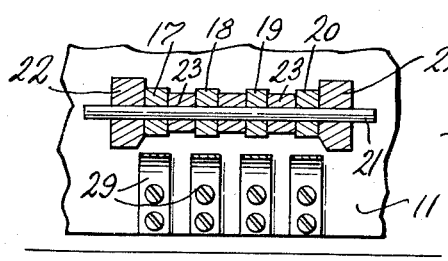
Fig. 3 is a sectional elevation through a portion of the same, the section being taken approximately along the line 3—3 of Fig. 4.

Within the housing formed of the end walls 11 and the sheet metal cover 14 I have provided a plurality of display levers 17, 18, 19 and 20. These levers are disposed side by side and pivoted on a common pivot 21 which extends between suitable bearing blocks 22, Fig. 3, provided on one of the end walls 11, and the levers are held in properly spaced relation to one another on the pivot 21 by suitable spacers or washers 23. The levers 17 to 20 extend in a direction lengthwise of the housing and at the ends opposite the pivot, each lever is provided with an upstanding display plate 24 which serves to detachably mount a picture or other display device. For convenience, the levers 17, 18, 19 and 20 may be made of wood and the display devices 24 on these levers may be plates of sheet metal secured to the levers so as to project upwardly therefrom. Each plate 24, at its upper end, is flanged laterally or horizontally as at 25, and its vertical side edges are also flanged toward one another on their forward faces so as to form guides 26 in which a removable sheet or display device 27 may be detachably mounted, such as by sliding it downwardly into the slots formed by the flanges 26. The upper edge of each display sheet 27 is also flanged laterally and rearwardly so as to rest upon the related flange 25 of the upstanding plate 24. The display device or sheet 27 may carry on its forward face a pictorial representation of some sort, and the laterally flanged upper end of such sheet 27 may bear thereon the spelling of a word related to the picture, as shown in Fig. 1.

The cover 14 of the housing is provided with an aperture or window 28 through which the upper ends of the display plates 24 extend slightly, and upwardly through which the plates are projected when the levers are elevated in a manner which will be explained presently, such an elevated position of one of the levers being illustrated by dash lines in Figs. 4 and 6. Each lever is urged upwardly, yieldingly, in any suitable manner such as by an individual leaf spring 29, these springs 29 being secured to the end wall 11 to which the levers are pivoted, with the free ends of the leaf springs bearing against the under edges of the levers 17 to 20. When any one of the levers 17 to 20 is released, it will be operated upwardly by its spring 29 into display position, but these levers will normally be latched downwardly in non-display positions in a manner which will be explained presently. Along the lower edge of each lever I arrange a plurality of hooks 30. The hooks 30 on the different levers are arranged in transverse rows, that is, the hooks on all the levers are arranged in rows that extend transversely of the levers, as shown clearly in Fig. 2.

Figure 2:
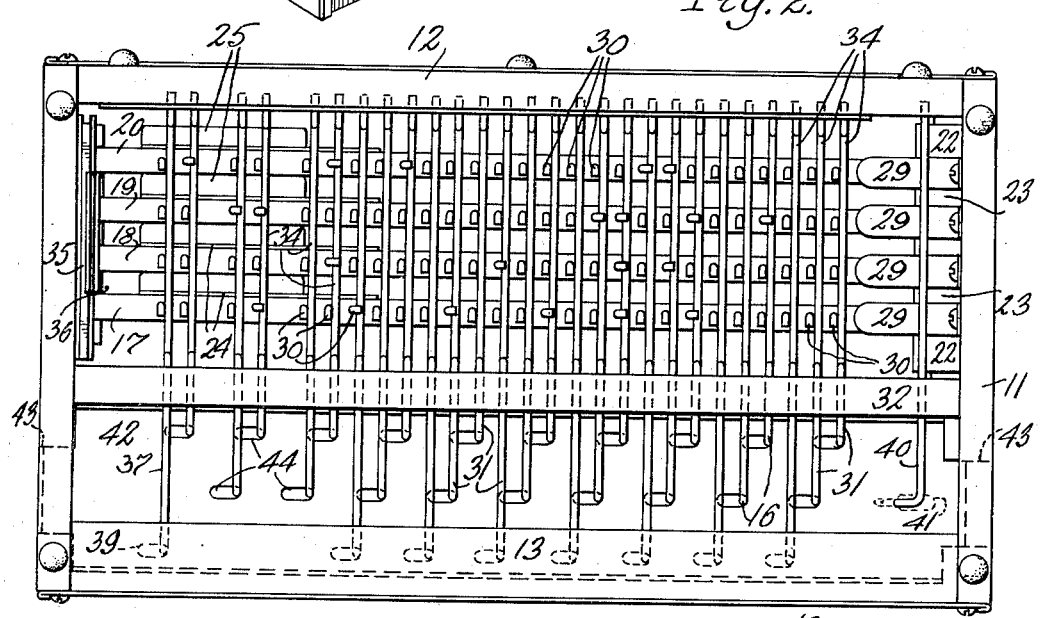
Fig. 2 is a bottom plan of the same.

A plurality of latch devices, which for convenience and simplicity may be pivoted bails or cranks 31, are disposed crosswise of the levers 17 to 20 and disposed side by side in a row along the lengths of the levers, there being an individual bail or latch device 31 for each transverse row of hooks 30, as is illustrated in Fig. 2. Each latch device or bail 31 is pivoted at its rear end in the wooden strip 12 and intermediate of its ends in a bearing 32 that extends between the end walls 11. The bearing portion of each bail in the strip 12 and in the bearing 32 are of course in axial alinement with one another, and the forward ends of the bails or latch devices 31 are bent upwardly to form the operating member 16 which projects through the slots 15 in the keyboard 14a.

The bearing 32 is preferably split lengthwise or made in sections, between which sections the latches or bails 31 are clamped or disposed in order to facilitate the assembly of the bails in the bearing, and also to provide for frictional engagement on the bails to hold them in adjusted positions. This friction may be varied by varying the clamping pressures of the sections of the bearing 32 on the bails 31, and while any suitable means may be employed for clamping the bearing sections together, this may be done in a simple manner by screws 33 which pass through and unite the sections and draw them together. By reason of the fact that the slots 15 extend in a direction endwise of the housing, each bail is capable of a limited rocking movement to the extent permitted by the engagement of the upstanding ends or handles 16 with the ends of the slots 15. Thus, when any member 16 is operated, its bail 31 will be rocked so as to carry a crank-like portion 34 thereof, that is provided between the bearing 32 and the strip 12, toward and from its related row of hooks 30.

The hooks 30 may be angular members or L-shaped, an arm of each of which extends into one of the levers 17 to 20 from their lower edges, each hook being supported in its lever for rotation about the longitudinal axis of that arm. The other or angular arm or free end of each hook 30 may thus be turned through a quarter revolution either into an inactive position in which it extends crosswise of the lengths of the levers and is parallel to the adjacent crank section 34 of the related bail element 31, or into a position in which it extends in a direction lengthwise of the lever on which it is mounted, so that it may overlie the crank portion 34 of the related bail 31 when the crank portion is shifted into latching position along the row of hooks 30.

The bails or latch devices 31 are arranged along corresponding sides of the transverse rows of hooks 30, as shown in Figs. 2 and 4 particularly, and the slots 15 are arranged so that when the operating ends or handles 16 of the bails or latching devices are at, say, the right hand ends of the slots 15, all of the crank portions 34 of the latch devices or bails will be disposed against their related transverse rows of hooks 30, which condition is shown in Figs. 2 and 4. For convenience in setting the hooks, the corresponding letters of the alphabet are provided also on the frame strip 12 where the rear ends of the bails or latch devices 31 are pivoted, this arrangement being shown in Fig. 4. Thus by taking a tool or wrench 35, Figs. 2, 4, 6 and 9, having a slot or socket in an end of it, and fitting that slot over the angular free end of any hook 30, as shown by the dash lines in Fig. 9, one may turn that hook 30 through a quarter turn so as to set it for latching engagement with the adjacent related bail 31 or so as to clear the bail. It will be understood that the hook 30 is always turned through the quarter turn into position to engage the bail which is designated by the proper letter on the keyboard, and to avoid confusion the same kind of an arrangement should be employed for all of the bails and hooks, in which case all of the hooks which are set will be turned to point in the same direction, that is, to overlie the bail or crank which is intended to control them and each of which represents a letter of the word to be set up. All of the hooks which engage any one crank should extend in the same direction to enable the crank to turn. The hooks when set should also be turned in the same direction so that when the resetting apparatus is operated, all of the cranks will be shifted beneath the properly set hooks which would not happen if some of the hooks were set to extend in one direction and other of the hooks were set in the diametrically opposite direction. The wrench 35 which is shown is merely a hexagonal bar having a slot across one end thereof which fits over the angular end of the hook 30, and it may be stored when not in use under a spring clip 36 provided on the under side of the housing as shown particularly in Fig. 4.

In the illustrated example of the invention, the hooks on the lever 20, which is the rearmost display lever, are set to spell the word "Cupid", and by reference to Fig. 4 it will be observed that the hooks 30 designated by the letters forming the word "Cupid" are set to place their angular ends to extend in a direction lengthwise of the lever 20, and to engage with the adjacent bail cranks 34. If now one moves to the left, Fig. 1, the upstanding ends 16 of the bails, which project through the slots 15 of the keyboard and are designated by the letters making up the letters C-u-p-i-d, all of the crank portions 34 of the bails 31 which engage the hooks 30 so set will be shifted laterally out of engagement with the angular ends of those set hooks 30 of the lever 20, whereupon the spring 29 acting on that lever 20 so released will shift it upwardly into display position which is shown by the dash lines in Figs. 4 and 6. On the display card 27 of that lever is a picture of Cupid, and the word "Cupid" is printed on the upper flanged end of that display card. Thus when a child operates the handles or projecting ends 16 representing the letters C-u-p-i-d, the lever 20 is automatically shifted upwardly to elevate the display card 27 of that lever into visible position above the housing, and thus display the picture of Cupid, which indicates to the child that he has spelled the word correctly, or set up on the keyboard, all the letters which make up the word "Cupid".

If one desires to change the word to be spelled, with that lever 20, it is merely necessary to place a new display card 27 with a new word on the lever, and then to set the hooks 30 of that lever into latching position for those bails or latches which are designated by the letters making up that word. Thereafter, in order to release that lever, all the letters of the new word must be set up on the keyboard in order to release all of the hooks 30.

In some words, such as the words "Moon" and "Homo", the same letter appears more than once, and in order that the device will be able to teach the spelling of such words a special repeat bail 37, Figs. 2, 4 and 5, may be provided, such as at one end of the housing, and this special bail is mounted in the same manner as the other bails and cooperates with a special transverse row of hooks 30 in the various levers 17 to 20. The operating end 38 of this bail 37 extends upwardly through a slot 29 in the keyboard, and the word "Repeat" is printed adjacent to the slot 39, so that a pupil attempting to spell any word by setting up the letters of that word on the keyboard will, where a letter is repeated or appears a second time, operate the repeat member 38 instead of the same letter a second time. It will be understood, of course, that the hook 30 cooperating with the repeat bail 37 on any lever will be turned into latch engaging position whenever the word to be spelled by means of that lever has the same letter appearing twice. The order of operation of the keys representing the letters making up a word to be spelled is unimportant in the machine because so long as all of the letters making up a word are operated, the target will be released and will fly up. There is little difficulty in teaching pupils the order in which the letters of a word occur if they know which letters make up the word.

In order to reset the operated bails or latch devices 31 after each operation in which a display device is forced upwardly into display position, I provide another special bail or lever 40 at one end of the housing, and it has a handle portion extending upwardly through a slot 41 which has associated therewith the word "Reset". This lever or bail 40 is pivoted in the same manner as the other bails or latch devices, but it has no crank portion. Disposed immediately beneath the keyboard is a plate 42 which may lie flat against the under face of the keyboard portion of cover 14, and has reduced or narrowed ends that slide in notches or slots 43 provided in the end walls 11. The upstanding operating arm of the lever or bail 40 which projects through the slot 41, passes loosely through an aperture in the plate 42, so that when the reset lever or bail 40 is operated or rocked, it may shift the plate 42 endwise to an extent permitted by the slot 41. The slot 41 is parallel to the slots 15 and preferably of approximately the same length. The plate 42 also has slots 44 therein through which the upstanding handles or ends 16 and 37 also extend, and these slots 44 are also parallel to the slots 15 and of approximately the same length.

When the plate 42 is shifted in one direction, such as to the right, for a resetting operation, the ends of slots 44 will engage with all of the upstanding handles or ends 16 or with the bail 37 of the repeat key or element, and will shift them all to the right until the crank portions 34 thereof are in latching relation to any of the hooks 30 which have been set for latching engagement, that is, with their angular ends extending in a direction endwise of the levers on which those hooks are mounted. When the reset member 40 is shifted to the left, however, the slots 44 will not engage and move the upstanding ends 16 or the bail 37, because the slot 41 limits such movement of the reset member 40 before the slots 44 can operate any of the members 16 or 37 to the left. Therefore, in resetting any display device, one merely forces the upstanding display device downwardly into the window or aperture 28, and then after it is completely depressed, the reset lever or member 40 is shifted to the right in Fig. 1, which shifts all of the latching devices or bails into positions to latch the display levers 17 to 20 into their lower or latched positions, ready for a new spelling operation.

While any suitable means may be employed for mounting the hooks 30 in the levers 17 to 20, this may be accomplished by rotatably supporting one arm of each hook 30 in a drilled hole of a display lever and each of such arms which extends into the lever is provided intermediate of its ends with an annular groove 45. Each lever 17 to 20 is provided in one vertical face with a recess or channel 46 which extends inwardly to the grooved portions 45 of the hooks 30. A suitable anchorage element 47 is placed in this recess 46, after all of the hooks 30 have been disposed in position in that lever, so as to fit into the grooves 45 of the hooks and anchor them against removal from that lever. For example a plastic or moldable mass may be forced around the grooves 45 of the hooks 30 so as to anchor the hooks 30 against removal from the levers while permitting their rotation, and the recess is then closed by a suitable, removable plate 48. Any suitable plastic mass, such as plastic wood, or glue, may be employed for this purpose, but one should be used which is easily molded and which sets after being disposed in the recess. By way of further example, rubber may be molded in the recess, and the rubber would give a frictional resistance to rotation of the hooks in the lever.

A slight modification of this mounting is illustrated in Fig. 9, in which each hook 30 is screwed into its related or corresponding lever, and it may be adjusted by turning it through a quarter revolution, which acts to thread it slightly into or out of the lever in which it is mounted. To assist in keeping the levers 17 to 20 moving in definite paths in their upward and downward movements, I may also provide spaced guide strips 49 on the end wall 11 opposite from the pivoted ends of these levers, Figs. 4 and 6, which strips form between them parallel slots in which the free ends of levers 17 to 20 are freely received and by which they are guided.

The operation of the device would appear to be obvious from the foregoing description, but it will be briefly reviewed. It will be understood that any desired number of display levers from one up may be employed, but in the drawings four levers are illustrated. These four levers have mounted thereon display devices 27 bearing the words "Mother", "Bird", "Flower" and "Cupid", as will be observed from Fig. 1. The hooks 30 on the levers 17 to 20 have been set so as to spell those words, that is, the hooks 30 corresponding to the letters making up those words have been set to engage the corresponding latch devices or bails. Let it now be assumed that the pupil is to attempt to spell the word "Cupid". If he spells it correctly by operating the finger pieces or handles 16 projecting through slots identified on the keyboard by the letters C-u-p-i-d, or moves the handles 16 designated by those letters, then all of the hooks on the lever 20 will be released from the crank portions 34 of the bails, and the lever 20 will then be forced upwardly automatically by its related spring 29, into the display position shown by the dash lines in Figs. 4 and 6.

If the word so spelled included the same letter more than once, such as the word "Moon" or the word "Homo" which includes the letter "o" twice, the student should operate the repeat key or member 38 instead of the extra letter of the same kind, otherwise the lever 20 would not be released. The student knows, from the automatic upward movement of the display device bearing the picture of Cupid and the word "Cupid" thereon, that he has correctly set up on the keyboard all of the letters making up that word. The student then resets the device by forcing the upstanding plate 24 downwardly into the housing, and then shifts the reset key or member 40 to the right, which automatically sets all of the bails into latching engagement with the levers, and the device is ready for a new spelling operation.

After a pupil has learned to spell all the words set up in this manner, the teacher can then either provide the pupil with another device set up with a different set of words and pictures or he may place new display cards on the levers 17 to 20 and then with a wrench 35 produce a new setting of the hooks 30 on the levers, so as to provide for the proper spelling of the new words. Thus the device is adaptable, by a few simple adjustments, for the spelling of a large variety of words, and the pupil may repeat the spelling operation and resetting over and over until he has its spelling thoroughly fixed in mind. If the words is to be spelled without looking at the card, the top or flanged portion of the display card can be folded under the card as it is inserted into the guides formed by the flanges 26, so that it will not be visible to the pupil.

It will be understood that the device is suitable for performing simple addition and multiplication problems merely by proper setting of the hooks and by putting pictures of numbers or answers on the display devices 27. In the working of simple addition, the numbers are set up on the keyboard in the same manner as the alphabet letters are set up. Let it be assumed that the pupil is to be taught that two plus three equals five. The pupil will then operate the "2" key and the "3" key, and when he does that, the target indicating "5" will be released and will fly up to indicate the correctness of the operation. If the problem two plus two is to be solved, for example, then the pupil operates the number "2" on the keyboard and then the repeat key which indicates that the same number is again included, thus he would operate the "2" key and the repeat key, and immediately the target bearing the numeral "4" would be released and fly up. If multiplication is to be performed, let it be assumed that the pupil is to be taught to multiply two times three. He will then operate the "2" and "3" keys on the keyboard, whereupon the target bearing the numeral "6" will be released and fly up to indicate the answer of the multiplication. If the same number is to be multiplied by itself, such as two times two, then the pupil operates the numeral "2" on the keyboard and also the repeat key, and thereupon the target bearing the numeral "4" will be released and fly up. It will be understood that the size of the words to be spelled and the problems to be performed in accordance with this device are limited to the simpler problems and to simpler spelling, but such devices have their value mainly in the teaching of the relatively young students who are having difficulty in learning the simpler problems and the spelling of simpler words. Other applications of the device will readily suggest themselves to the teachers.

If desired, suitable stops may be provided on the hooks to compel their operation only between the active and inactive positions so that there will be no danger of any one setting them improperly. In other words they will be turnable only through one angle of 90° between the active and inactive positions. Instances of such rotatable parts are found in petcock valves, and since such features are well known and per se are not a part of this invention, they have not been illustrated.

It will also be understood that various other uses and changes in the details, materials, and arrangements of parts, which have been herein described and illustrated by way of example, in order to explain the nature of the invention, may be made by those skilled in the art within the principle and scope of the invention, as expressed in the appended claims.

I claim:

1. An educational and amusement device comprising a display element mounted for movement between retracted and display positions, means yieldingly urging said element into display position, a plurality of hooks on said element individually and selectively settable in either of two correct positions, one of which is an active position and the other an inactive position, and a plurality of latches each engageable with those hooks on said element which are set in active positions to extend in the same directions and clearing the other of said hooks, to hold said element in retracted position, whereby when all of the latches that are engaged with all of the hooks that are set in active positions, are operated to release the hooks engaged thereby, said element will be automatically operated into display position.

2. The device substantially as set forth in claim 1 in which said element bears a selected display picture, each latch represents a letter of the alphabet, and the hooks set to engage the latches are those which engage related latches that represent the letters that spell a word relating to said picture, whereby when one releases all the latches that represent letters making up a word suggested by said picture, said picture will be operated automatically into display position.

3. An educational and amusement device comprising a display element mounted for movement between retracted and display positions, means yieldingly urging said element into display position, a plurality of hooks on said element individually and selectively settable in either of two correct positions, one of which is an active position and the other an inactive position, a plurality of latches each engageable with those hooks on said element which are correspondingly set in active positions and clearing the others of said hooks, to hold said element in retracted position, whereby when all of the latches that are engaged with all of the hooks that are set in active positions, are operated to release the hooks engaged thereby, said element will be automatically operated into display position, and a common reset device acting on all of said latches for resetting them all at one operation in engagement with said hooks which are in active position and which extend in the same direction.

4. An educational and amusement device comprising a plurality of display elements mounted for individual movement between retracted and display positions, means yieldingly urging each element into display position, a plurality of latches each representing a letter of the alphabet extending transversely of said elements, a plurality of hooks on each element, one for each of said latches, each hook being individually adjustable on its element into a position for engagement with its related latch, and a pictorial display member detachably mounted on each element, whereby when all of the latches that are in latched engagement with all of those hooks on any one element that are set in active position to engage their related cranks, are operated to release the hooks, said element so released will be automatically operated into display position.

5. An educational and amusement device comprising a display element mounted for movement between retracted and display positions and having a plurality of hooks arranged along the same, and a plurality of latches also arranged along said element and in proximity to said hooks, said hooks being individually adjustable into and out of positions for latching engagement with an adjacent related latch, whereby the latches, all of which must be operated in order to release all of the hooks on said element, may be selectively determined, and said element will be automatically released by the operation of a selected group of said latches and then automatically projected into display position.

6. The device substantially set forth in claim 5 in which there is a picture on said display element, a separate latch for each letter of the alphabet, and a separate hook for each of said latches, whereby when one releases all the latches that represent letters spelling a word suggested by said picture, said picture will be operated automatically into display positions.

7. An educational and amusment device comprising a display element mounted for movement between retracted and display positions and having a plurality of hooks arranged along the same, a plurality of latches also arranged along said element and in proximity to said hooks, said hooks being individually adjustable into and out of positions for latching engagement with an adjacent related latch, whereby the latches, all of which must be operated in order to release all of the hooks on said element, may be selectively determined, and said element will be automatically released by the operation of a selected group of said latches and then automatically projected into display position, and a common resetting device operable simultaneously on all of said latches which have been operated to release a hook, for resetting said latches into latching engagement with all of said hooks which have been adjusted into positions for latching engagement with said latches in which they point in the same direction.

8. An educational and amusement device comprising a plurality of levers disposed side by side, and each having a selected display picture releasably mounted thereon, means urging each of said levers into a display position, each lever having arranged lengthwise along the same a plurality of hooks, each corresponding to a different letter of the alphabet, and a plurality of latches, one corresponding to each of said letters of the alphabet, arranged along said levers and extending crosswise of the row of levers and alongside of said hooks, corresponding hooks on said levers being arranged in rows, with those of the same row cooperating with the same latch, each hook being individually settable into and out of latching engagement with its adjacent related latch, and the engagement between any latch and its related hook in latching engagement therewith being sufficient to hold the lever in non-display position, whereby when the hooks on any lever are set into latching positions, corresponding to the letters of the alphabet which spell a word relating to the picture mounted on that lever, and the latches corresponding to those letters are operated, said lever will be automatically released and shifted immediately into display position.

9. An educational and amusement device comprising a plurality of levers disposed side by side, and each having a selected display picture releasably mounted thereon, means urging each of said levers into a display position, each lever having arranged lengthwise along the same a plurality of hooks, each corresponding to a different letter of the alphabet, a plurality of latches, one corresponding to each of said letters of the alphabet, arranged along said levers and extending crosswise of the row of levers and alongside of said hooks, corresponding hooks on said levers being arranged in rows, with those of the same row cooperating with the same latch, each hook being individually settable into and out of latching engagement with its adjacent corresponding latch in which all the set hooks extend in the same direction, and the engagement between any latch and its related and corresponding hook being sufficient to hold the lever in non-display position, whereby when the hooks on any lever are set into latching positions, corresponding to the letters of the alphabet which spell a word relating to the picture mounted on that lever, and the latches corresponding to those letters are operated, said lever will be automatically released and shifted immediately into display position, and a common device operable upon all of said latches for setting them in latchable positions with respect to said hooks on said levers.

10. The device substantially as set forth in claim 1 in which said element bears a selected display picture, each latch represents a letter of the alphabet, and the hooks set to engage the latches are those which engage latches that represent the letters that spell a word related to said picture, and in which an extra latch and an extra hook are provided to represent a duplication of any letter, whereby when one releases all the latches that represent letters spelling a word suggested by said picture, and in case of the same letter appearing more than once in the word, by operation of said extra latch, said picture will be operated automatically into display position.

11. An educational and amusement device comprising a plurality of pivoted levers arranged side by side and individually movable into display positions, means yieldingly urging each lever into display position, a plurality of L-shaped hooks arranged on each lever along the same in spaced relation to one another, with the angular end of each hook shiftable into a position crosswise of the lever on which it is mounted or into a position in which it extends in a direction lengthwise of the lever, and a plurality of latches extending across said levers and alongside the hooks on each lever, each lever having a hook for each corresponding latch, whereby when any hook on any lever is turned to set its angular end to extend in a direction endwise of that lever, it may have latching engagement with the adjacent latch, and each latch having an individual operating handle, whereby when all of the latches that are engaged with all of the hooks that are set in latching positions on any one lever, are operated to release the hooks engaged thereby, that lever will be automatically operated into display positions.

12. A device substantially as set forth in claim 11 in which each element bears a selected display picture, and each latch represents a letter of the alphabet, whereby when the hooks on any lever that are set to engage the latches are those which engage latches that represent the letters that spell a selected word related to said picture, and all of the latches engaging the hooks on any one lever are operated, the lever so released will be automatically operated into display position as a signal of the correct designation of the letters composing that word.

13. An educational and amusement device comprising a plurality of pivoted levers arranged side by side and individually movable into display positions, means yieldingly urging each lever into display position, a plurality of L-shaped hooks arranged on each lever along the same in spaced relation to one another, with the angular ends of said hooks shiftable into corresponding positions pointing in the same direction crosswise of the lever on which it is mounted or into a position in which it extends in a direction lengthwise of the lever, a plurality of latches extending across said levers and alongside the corresponding hooks on each lever, each lever having a hook for each latch, whereby when any hook on any lever is turned to set its angular end to extend in a direction endwise of that lever and over its corresponding latch, it may have latching engagement with the adjacent related latch, and each latch having an individual operating handle, whereby when all of the latches that are engaged with all of the hooks that are set in latching positions on any one lever, are operated to release the hooks engaged thereby, that lever will be automatically operated into display position, and a common resetting member having a lost motion connection to each latch, by which each latch may be individually operated, without operation of the other latches, to release a hook, and by operation of which member in one direction, all of said latches which may be out of latching position will be shifted into positions for latching engagement with said hooks.

14. An educational and amusement device comprising a plurality of pivoted display levers disposed side by side in an approximately parallel relation to one another, each lever being individually and yieldingly urged into display position, means on each lever for detachably mounting thereon a picture which would become visible when that lever is operated into display position, each lever having arranged along the same, a plurality of L-shaped hooks, and each hook being individually operable on its lever from a position in which the free angular end extends crosswise of the lever to a position in which such angular end extends in a direction lengthwise of the lever, and a plurality of pivoted bails extending across the group of levers and alongside corresponding ones of said hooks on different levers, the hooks on the different levers being arranged in rows along said bails so that each bail may be rocked to latch with one or all of the corresponding hooks in any transverse row on the different levers, each bail having an operating arm extending therefrom, and the operating arms of all the bails being arranged in keyboard style, by which each bail may be individually operated, whereby when selected hooks on any lever are set to place their angular ends extending in corresponding directions lengthwise of that lever and the hooks so set are latched to the bails, the individual bails corresponding to those hooks so set must be rocked to release that lever, and cause it to be projected in display positions.

15. The device substantially as set forth in claim 14 in which each bail and each hook represents a letter of the alphabet, whereby when the hooks on any lever and representing the letters spelling a selected word are turned into latching positions with respect to the adjacent bails, the operation of the bails corresponding to those letters will release that lever and said lever will be projected into display position.

16. The device substantially as set forth in claim 14 in which the lever carries a selected picture, each bail and each hook on a lever represents a letter of the alphabet, and an extra hook on each lever and an extra bail cooperating with said extra hook represents a repeat letter, whereby when the set hooks on any lever represent the letters composing a selected word relating to the picture on that lever, the operation of the bails corresponding to those letters will cause a release of that lever and its automatic movement into a position to display the picture to which the word relates.

17. An educational and amusement device comprising a plurality of pivoted display levers disposed side by side in an approximately parallel relation to one another, each lever being individually and yieldingly urged into display position, means on each lever for detachably mounting thereon a picture which would become visible when that lever is operated into display position, each lever having arranged along the same, a plurality of L-shaped hooks, and said hooks being individually operable on their levers from positions in which their free angular ends extend crosswise of the lever to positions in which such angular ends extend in corresponding directions lengthwise of the lever, a plurality of pivoted bails extending across the group of levers and alongside said hooks on different levers, the hooks on the different levers being arranged in rows along said bails so that each bail may be rocked to latch with one or all of the hooks in any transverse row on the different levers, each bail having an operating arm extending therefrom, and the operating arms of all the bails being arranged in keyboard style, by which each bail may be individually operated, whereby when selected hooks on any lever are set to place their angular ends extending in directions lengthwise of that lever and the hooks so set are latched to the bails, the individual bails corresponding to those hooks so set must be rocked to release that lever, and cause it to be projected in display position, and a common reset member having slots through which the operating end of each bail extends, with the slots extended in the direction of movement of the bail portions passing therethrough when the bails are operated to release a hook, said reset member being shiftable in a direction to carry all of said bails that are out of latching positions with respect to their related hooks, in the same direction into latching engagement with the hooks of said levers.

WALTER E. BARNARD.